Patented Dec. 26, 1939

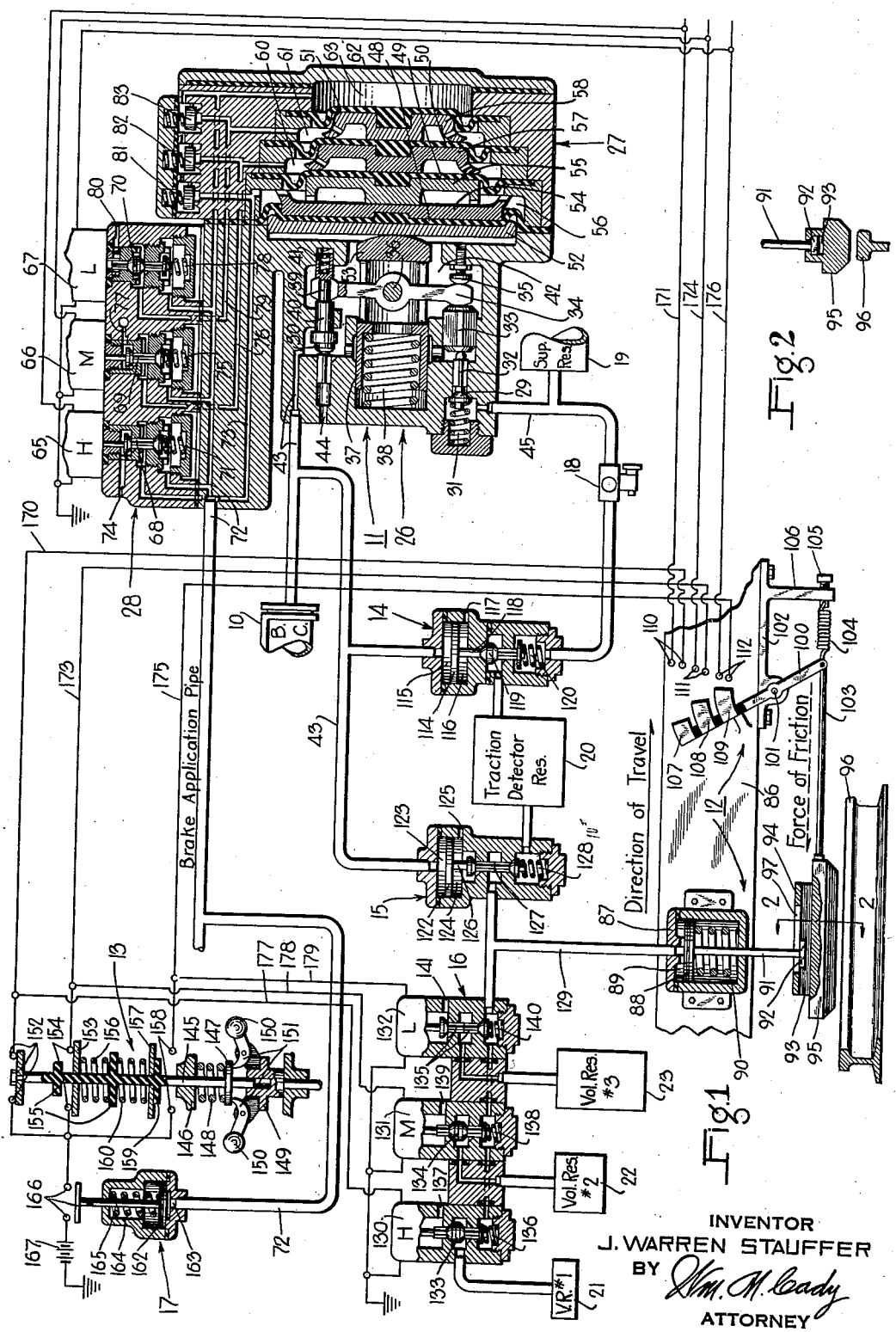

2,184,568

UNITED STATES PATENT OFFICE 2,184,568

BRAKE CONTROL DEVICE

Jay Warren Stauffer, East McKeesport, Pa., assignor to The Westinghouse Air Brake Company, Wilmerding, Pa., a corporation of Pennsylvania Application December 15, 1937, Serial No. 179,929

27 Claims. (Cl. 303—21)

This invention relates to brake control devices, and more particularly to brake control devices for controlling the brakes on railway trains and traction vehicles.

The air brake has long been the standard brake for railway trains and traction vehicles. As is well understood, this brake employs brake shoes engaging with the treads of the vehicle wheels to produce the braking action. When the brake shoes are applied to the wheel treads with a given force, the resultant degree of braking effect is relatively lower when the vehicle or train is traveling at a high speed than when the vehicle or train is traveling at a low speed. This is due to the fact that the coefficient of friction between the brake shoes and vehicle wheel treads is lower at high speeds than at low speeds. Because of this phenomenon, if the brakes are applied to a high degree at a high speed, the braking force must be reduced as the speed of the train or vehicle diminishes, or otherwise sliding of the wheels may result. Wheel sliding is objectionable not only because of the damage resulting to the wheels, but also because the retarding effect produced by a sliding wheel is less than that produced by a rolling wheel, which necessarily increases the length of the stop.

In order to minimize the danger of wheel sliding, and to at the same time produce a comparatively short and uniform stop, there has heretofore been proposed a brake equipment in which the degree of the braking effect has been reduced in predetermined steps as the speed of the train or vehicle diminishes. A brake equipment of this type is illustrated and described in the pending application of Ellis E. Hewitt, Serial No. 88,098, filed June 30, 1936, and assigned to the assignee of the present application.

Brake systems embodying the features disclosed in the Hewitt application have been in use for several years and have under the most severe service conditions demonstrated their utility beyond question. However, in the design of such brake systems it is apparent that certain assumptions must be made with respect to the tractive condition of the rails to be encountered, with the result that if the rail conditions encountered are universally better than that assumed full advantage cannot be taken of these conditions to produce the shortest possible stop, while on the other hand if rail conditions are below that assumed the force with which the brakes are applied may be too high for the existing track conditions and some wheel sliding may result.

In carrying forward my invention I propose to provide means for detecting at all times during a brake application the tractive condition of the rails and to thereupon instantly, and continuously, establish the permissible limit to which the brakes may be applied, thus enabling the brakes to be applied more precisely according to the actual condition of the rails existing throughout the stop.

It is accordingly a prime object of the present invention to provide a brake system in which the permissible maximum degree of application of the brakes is established more nearly according to the actual tractive condition of the rails over which the train or vehicle is passing at the time the brakes are applied.

A further object of the invention is to provide a novel means for detecting the tractive condition of the rails over which the vehicle or train is passing at the time the brakes are applied, and to associate said means with the control of the brakes so as to at all times during the application prevent the degree of the application from exceeding a value which is likely to produce sliding of the wheels.

A yet further object of the invention is to provide means for detecting the tractive condition of the rails for each instant during the brake application, and for reducing the degree of the application as the tractive condition becomes bad and for increasing (within limits) the degree of the application as the tractive condition improves.

A still further object of the invention is to provide a brake system wherein the degree of the brake application is controlled both with respect to the speed of the vehicle (or train) and with respect to the tractive condition of the rails over which the vehicle or train is passing at and during the time the brakes are applied.

A yet further object of the invention is to provide means for detecting the tractive condition of the rails and for associating said means with a brake equipment of the type illustrated in the aforementioned Hewitt application, in a manner such that the degree of application of the brakes is jointly controlled according to the speed of the vehicle (or train) and the tractive condition of the rail.

Other objects of the invention, dealing particularly with the arrangement and construction of parts, will be more fully understood from the following description, which is taken in connection with the attached drawing, wherein, Fig. 1 shows in schematic and diagrammatic form an embodiment of the invention in a brake equipment illustrated for one car of a train.

Fig. 2 shows a view of the rail-engaging device illustrated in Fig. 1, taken substantially along the line 2—2.

Referring now to the drawing, the brake system there illustrated comprises a brake cylinder 10, a control valve device 11, a traction detector device indicated in its entirety at 12, a speed controlled switch device 13, two pressure operated valve devices 14 and 15, a magnet valve device 16, a pressure operated switch device 17, and a feed valve device 18. Also shown are a supply reservoir 19, a traction detector reservoir 20, and three volume reservoirs 21, 22 and 23, designated as "volume reservoir No. 1," "volume reservoir No. 2," and "volume reservoir No. 3," respectively. The three volume reservoirs differ in volume, as illustrated, for a purpose to be explained later.

Considering now more in detail the parts above enumerated, the brake cylinder 10 is preferably of conventional design, and is arranged to operate any type of friction brake (not shown), and while only one brake cylinder has been illustrated it will be apparent that as many may be employed as are found desirable.

Considering now the control valve device 11, this device comprises a relay valve portion 26, a diaphragm portion 27, and a magnet valve portion 28.

Considering first the relay valve portion, this portion includes a supply valve 29 and a release valve 30 for controlling the supply of fluid under pressure to and its release from the brake cylinder 10. The supply valve 29 is urged toward a seated position by a spring 31 and is provided with a fluted stem 32 engaging one end of a slidable plunger 33. The other end of the slidable plunger engages the lower end of a lever 34. In the position illustrated, the lower end of the lever 34 rests between the right hand end of the plunger 33 and an adjustable stop 35.

The lever 34 is pivoted intermediate its end on a pin 36 which is carried by a hollow cylindrical member 37. The member 37 is slidable in a bore in the casing, and reacting between the casing and the member 37 is a spring 38. This spring acts to bias the member 37 to the right.

The upper end of the lever 34 is bifurcated to embrace a reduced portion 39 of a stem 40 attached to or forming a part of the release valve 30. The right hand end of the stem 40 is, as illustrated, recessed to receive and contain a biasing spring 41. This spring urges the release valve 30 and its stem 40 toward the left, but the release valve is held in an unseated position, for the condition of the parts illustrated, by action of the spring 38.

The casing enclosing the parts just described defines a chamber 42 which is in open communication with the brake cylinder 10 by way of pipe and passage 43. With the release valve 30 unseated and the supply valve 29 seated, as illustrated, the brake cylinder 10 and chamber 42 are in communication with the atmosphere by way of port 44. When the release valve 30 is seated and the supply valve 29 is unseated, communication is established between the chamber 42 and the supply reservoir 19 by way of pipe 45.

Considering next the diaphragm section 27, this section comprises spaced, unconnected diaphragms 48, 49, 50 and 51, having areas diminishing in the order named. The diaphragm 48 is provided with a follower plate 52 which engages head 53 of the slidable member 37. Also attached to the diaphragm 48 is a spacing member 54, and attached to the diaphragm 49 is a similar spacing member 55, which as will be observed cooperates with the member 54 to hold the two diaphragms 48 and 49 in spaced relationship so as to define a chamber 56.

The diaphragms 50 and 51 are, respectively, similarly provided with spacing members 57 and 58, which serve to hold these diaphragms in spaced relationship whereby there is defined between diaphragms 49 and 50 a chamber 60 and between diaphragms 50 and 51 a chamber 61. A cap 62 secured to the diaphragm section forms with the diaphragm 51 another chamber 63.

Now when fluid under pressure is simultaneously supplied to the four diaphragm chambers 56, 60, 61 and 63 to the same degree, it will be apparent that the pressures on either side of each of diaphragms 49, 50 and 51 will be balanced, and due to the fact that the diaphragms are unconnected and are therefore free to move individually, only the diaphragm 48 will be flexed and it will accordingly move to the left.

In moving to the left the diaphragm 48 shifts the slidable member 37 with it, whereupon the release valve 30 will be first seated and thereafter the supply valve 29 will be unseated, to supply fluid under pressure to chamber 42 and brake cylinder 10. When pressure in chamber 42 is substantially equal to the pressure in chamber 56, the diaphragm 48 will move to the right and permit supply valve 29 to be seated without unseating release valve 30. Brake cylinder pressure will then correspond to the pressure in chamber 56.

If now the pressure in the chamber 56 is reduced to zero, while the original pressure is maintained in the other chambers, the pressures on either side of diaphragm 49 will no longer be balanced, and due to the fact that this diaphragm is smaller in area than the diaphragm 48, the overbalancing pressure acting to the left of diaphragm 48 will shift it to the right and thus unseat the release valve 30. Fluid under pressure will be released from the brake cylinder 10 and chamber 42 until such time as the pressure acting to the left of diaphragm 48 is balanced by the pressure acting to the right of diaphragm 49. When this condition obtains the release valve 30 will be seated whereupon brake cylinder pressure will bear to the pressure in chamber 60 the same relation that the area of diaphragm 49 bears to the area of diaphragm 48.

If now the pressure in chamber 60 is reduced to atmospheric pressure, while the original pressure is maintained in the other chambers, it will be apparent that brake cylinder pressure will be reduced until it bears to the pressure in chamber 61 the same relation that the area of diaphragm 50 bears to the area of diaphragm 48.

In a like manner, if the pressure in chamber 61 is subsequently reduced to atmospheric pressure, while the original pressure is maintained in chamber 63, brake cylinder pressure will be reduced until it bears to the pressure in chamber 63 the same relation that the area of diaphragm 51 bears to the area of diaphragm 48.

It will thus be apparent that upon initially supplying fluid under pressure to a like degree to each of the chambers 56, 60, 61 and 63 the initial brake cylinder pressure established will be equal to the unit pressure in any one of these chambers, and that upon subsequently and progressively reducing the pressure in each of these chambers to atmospheric pressure, in the order named, brake cylinder pressure will be reduced progressively in predetermined steps, established according to the respective areas of the diaphragms.

Considering now the magnet valve section 28, this section includes three electromagnets 65, 66 and 67, which for convenience will hereinafter be designated as "high," "medium" and "low" speed electromagnets respectively.

The high speed electromagnet 65 operates a valve unit designated by the numeral 68, and the middle speed electromagnet 66 operates a valve unit designated by the numeral 69, while the low speed electromagnet 67 operates a valve unit designated by the numeral 70.

When the high speed electromagnet 65 is deenergized, a spring 71 holds the valve unit 68 in its upper position, as illustrated, in which case diaphragm chamber 56 is placed in communication with the atmosphere by way of passage 73 and restricted port 74. When the high speed electromagnet 65 is energized, the valve unit 68 is shifted to its lower position, in which case the communication between the chamber 56 and the atmosphere is closed, and the chamber 56 is placed in communication with pipe and passage 72.

When the middle speed electromagnet 66 is deenergized, spring 75 holds the valve unit 65 in the upper position illustrated, in which case diaphragm chamber 60 is placed in communication with the atmosphere by way of passage 76 and restricted port 77. When the middle speed electromagnet 66 is energized, this communication to the atmosphere is closed and the chamber 60 is placed in communication with the pipe and passage 72.

When the low speed electromagnet 67 is deenergized, spring 78 holds the valve unit 70 in the upper position illustrated, in which case diaphragm chamber 61 is placed in communication with pipe and passage 72. When the electromagnet 67 is energized, the valve unit 70 is shifted to its lower position in which case communication between pipe and passage 72 and chamber 61 is closed and chamber 61 is connected to the atmosphere by way of passage 79 and restricted exhaust port 80.

It will be observed that in the upper portion of the diaphragm section 27 there is provided three spring seated check valves 81, 82 and 83. These check valves provide, respectively, a one-way communication from each of diaphragm chambers 56, 60 and 61 to pipe and passage 72, so that fluid under pressure may be released from these chambers simultaneously with the release of fluid under pressure from pipe and passage 72 at a time when the valve units 68, 69 and 70 have closed communication between the pipe and passage 72 and the chambers.

Considering now the traction detector device 12, this device is preferably mounted upon an unsprung frame member 86 of the vehicle truck. Secured to this unsprung truck frame member is a cylinder 87, and within the cylinder is a piston 88 subject on its uppermost side to pressure of fluid in a chamber 89 and on its lowermost side to pressure of a light biasing spring 90 disposed in a chamber normally at atmospheric pressure.

To the piston 88 is secured a stem 91, the lower end of which terminates in a T-shaped head 92. The head 92 is disposed in a slot 93 formed by a bracket 94 on a rail-engaging shoe device 95. This rail-engaging shoe is adapted to engage a track rail 96. As will be observed, a longitudinal slot 97 is provided in the top of the bracket 94 so that the shoe 95 may move longitudinally with respect to the piston stem 91.

Also mounted on the truck frame member 86 is a contact arm member 100, which is pivotally mounted intermediate its ends at 101 to a bracket 102 secured to the truck frame member. The lower end of the arm 100 is connected by a rod 103 to the shoe 95, and also to one end of a calibrated spring 104. The opposite end of the spring 104 is connected to an adjusting screw 105 carried by an arm 106 forming a part of the bracket 102.

Insulated from and carried by the upper end of the arm 100 are three contact segments 107, 108 and 109. These contact segments are adapted to engage, respectively, with three sets of stationary contacts 110, 111 and 112, in the inverse of the order named.

When fluid under pressure is supplied to the chamber 89 of the cylinder 87, the shoe 95 is depressed into engagement with the track rail 96. The force with which the shoe 95 engages the rail depends upon the pressure in the chamber 89. As the vehicle moves along the rail the resultant force of friction between the shoe 95 and rail 96 causes the shoe 95 to move longitudinally with respect to the vehicle against the opposition of the calibrated spring 104. The movement of the shoe thus rotates the arm 100.

If it is assumed that the vehicle is traveling in the direction indicated by the arrow marked "Direction of travel," then the force of friction acting upon the shoe 95 will be in the direction of the dotted arrow marked "Force of friction." The arm 100 will thus be rotated in a clockwise direction, and if its movement is great enough will cause the contact segments 109, 108 and 107 to engage, successively and respectively, the sets of contacts 112, 111 and 110.

If the movement of the arm is less than a maximum the arm will assume an intermediate position where one or more of the contact segments engage one or more of the contact sets. The point of importance to note, however, is that the angular position of the arm 100 will (for a given speed range) correspond substantially to the force of friction acting upon the shoe 95 and thus according to the tractive condition of the rail, because it will be obvious that for a given pressure in the chamber 89 the force of friction acting on the shoe 95 will (for a given speed range) depend substantially upon the condition of the rail.

Considering now the pressure operated valve device 14, this device is embodied in a casing having disposed therein a piston 114 subject on one side to pressure of fluid in a chamber 115, and on the opposite side to the atmospheric pressure in a chamber 116 normally open to the atmosphere by way of port 117. The piston 114 is provided with a stem 118 engaging a valve 119, which valve is normally held in an upper position by a spring 120.

In the position of the valve 119 illustrated, communication is established between the feed valve device 18 and the traction detector reservoir 20. Upon supply of fluid at a low pressure, as for example ten pounds, to the chamber 115, the valve 119 is actuated to lower seated position to close communication between the feed valve device and the traction detector reservoir. As the valve 119 moves to lower seated position the seal between stem 118 and the bore in which it moves is close enough to prevent loss of pressure from the traction detector reservoir to the chamber 116.

The pressure operated valve device 15 is similar to the valve device 14, being also provided with a piston 122 subject on its uppermost side to pressure of fluid in a chamber 123 and on its lowermost side to the atmospheric pressure in a chamber 124 normally open to the atmosphere by way of port 125. The piston is provided with a stem 126 engaging a valve unit 127, which valve unit is normally urged to an upper position by a spring 128.

In the illustrated position of the valve unit 127, communication is established between a pipe 129 and the atmosphere by way of port 125. Upon supply of a fluid at a low pressure, as for example ten pounds, to the chamber 123, the piston 122 actuates valve unit 127 downwardly to close communication between pipe 129 and the atmosphere, and to open communication between the traction detector reservoir 20 and the pipe 129.

The magnet valve device 16 comprises three electromagnets 130, 131 and 132 hereinafter designated for convenience as the H, M and L electromagnets. The H electromagnet controls operation of a double beat valve 133, the M electromagnet 131 controls operation of a double beat valve 134, while the L electromagnet controls operation of a valve unit 135.

When the H electromagnet 130 is deenergized a spring 136 holds the double beat valve 133 in upper seated position, in which case volume reservoir No. 1 is connected to the pipe 129. When the H electromagnet is energized this communication is closed and volume reservoir No. 1 is connected to the atmosphere by way of exhaust port 137.

When the M electromagnet 131 is deenergized a spring 138 holds the double beat valve 134 in upper seated position in which case volume reservoir No. 2 is connected to pipe 129. When the M electromagnet is energized, this communication is closed and volume reservoir No. 2 is connected to the atmosphere by way of exhaust port 139.

When the L electromagnet 132 is deenergized, a spring 140 holds the valve unit 135 in the upper position illustrated, in which case volume reservoir No. 3 is connected to the atmosphere by way of exhaust port 141. Upon energization of the L electromagnet the valve unit 135 is shifted to lower position, closing communication to the atmosphere and connecting volume reservoir No. 3 to the pipe 129.

Considering now the speed controlled switch device 13, this device comprises a stem 145, preferably made of electrically insulating material such for example as Bakelite or hard rubber, and slidable in a bore in a stationary frame part 146. Secured to the stem 145 is a collar 147 and acting between the frame part 146 and this collar 147 is a spring 148. Disposed below the collar 147 and supporting the lower end of the stem 145 is a rotatable member 149. This member carries pivotally mounted thereto two fly-ball weights 150.

The rotatable member 149 is suitably connected to some rotating part of the vehicle, such for example as the vehicle axle, so that it rotates at a speed corresponding to vehicle speed. As the member thus rotates the innermost ends 151 of the arms carrying the fly-ball weights 150 act upon the underside of the collar 147 and thus shift the stem 145 upwardly a distance dependent upon the compression of spring 148. As the speed of the vehicle diminishes the force acting on the underside of the collar 147 also diminishes, and spring 148 shifts the stem 145 downwardly. The vertical position of the stem 145 depends upon the speed of the vehicle.

Rigidly secured to the uppermost end of the stem 145 is one member of a set of contacts 152. Loosely disposed on the stem 145 is a contact plate 153 which is adapted to engage stationary contacts 154 and is movable on the stem 145 between two collars 155. A spring 156 biases the contact plate 153 in an upward direction.

Also loosely disposed on the stem 145 is a second contact plate 157. This contact plate is adapted to engage two stationary contacts 158 and is movable between the lowermost of the two collars 155 and another collar 159. A spring 160 biases the contact plate 157 in a downward direction.

The parts of the speed controlled switch device are so arranged that when the vehicle is traveling above a certain high speed, as for example sixty miles per hour, the contacts 152 are closed, and the contact plate 153 engages the stationary contacts 154, while the contact plate 157 is out of engagement with the stationary contacts 158.

At the instant the vehicle speed diminishes below sixty miles per hour, contacts 152 are opened but contact plate 153 remains in engagement with stationary contacts 154, while contact plate 157 is still out of engagement with contacts 158.

When the vehicle speed diminishes below an intermediate speed, as for example forty-five miles per hour, contact plate 153 disengages from contacts 154, while the contact plate 157 has not yet engaged the stationary contacts 158.

When the vehicle speed diminishes to a low chosen speed, as for example fifteen miles per hour, the contact plate 157 engages the stationary contacts 158.

Considering now the pressure operated switch device 17, this device is embodied in a casing containing a piston 162 subject on its lowermost side to pressure of fluid in chamber 163 and on its uppermost side to pressure of a spring 164 disposed in a chamber normally open to the atmosphere.

The piston 162 is provided with a stem 165 which carries insulated therefrom one member of a set of contacts 166. As will be observed, the contacts 166 control communication between a battery 167 and the speed controlled switch device 13. The contacts 166 are normally held open by the spring 164, but upon supply of fluid at a low pressure to the chamber 163, as for example three or four pounds pressure, the piston 162 is actuated upwardly to close contacts 166. It will be observed that the switch device 17 is connected to the aforementioned pipe 72, which for convenience will be termed a brake application pipe.

Considering now the electric circuits illustrated, it will be observed that the contacts 152 of the speed controlled switch device 13 and the contacts 107 and 110 of the traction detector device 12 jointly control a circuit leading to the high speed electromagnet 65, which circuit comprises conductors 170 and 171. The contacts 153 and 154 of the speed controlled switch device and the contacts 108 and 111 of the traction detector device jointly control a circuit leading to the middle electromagnet 66, which circuit includes conductors 173 and 174. The contacts 157 and 158 of the speed controlled switch device and the contacts 109 and 112 of the traction detector device jointly control the circuit leading to the low speed electromagnet 67, which circuit includes conductors 175 and 176.

In addition to the control just mentioned, the contacts 152 of the speed controlled switch device also control a circuit 177 leading to the H electromagnet 130, and contacts 153 and 154 control a circuit 178 leading to the M electromagnet 131, while the contacts 157 and 158 control a circuit 179 leading to the L electromagnet 132.

In all cases, it will be observed that one terminal of the battery 167 is grounded as is one terminal of each of the electromagnets referred to, so that circuits are completed when the contacts mentioned are closed.

*Operation*

When the train or vehicle is running under power, or is coasting, the brake application pipe 72 is maintained connected to the atmosphere, in which case the several parts of the control valve device 11 are conditioned as illustrated. The brake cylinder 10, or brake cylinders, will be connected to the atmosphere and as a result the brakes will be released.

Supply reservoir 19 will be maintained charged in the usual manner, and the feed valve device 18 will deliver fluid to the traction detector reservoir 20 at a pressure corresponding to its setting. The feed valve device 18 is employed so as to limit or vary the pressure to which the traction detector reservoir may be charged, to suit the design of the traction detector parts, and so that the pressure therein may be adjusted for different pressure values in the supply reservoir.

Assuming that the vehicle is traveling at a relatively high speed, as for example in excess of the sixty miles per hour heretofore mentioned, the other parts of the equipment will be in the positions illustrated.

When now it is desired to effect an application of the brakes, fluid under pressure is supplied to the brake application pipe 72 to a degree in accordance with the desired degree of the brake application. When a low pressure (e. g. three or four pounds) has been established in the brake application pipe the switch device 17 will close its contacts 166, and since it was assumed that the vehicle was traveling in excess of sixty miles per hour it will be obvious that conductors 170 and 173 will be connected to battery 167, but circuits to each of the high speed electromagnet 65 and the middle speed electromagnet 66 will not be immediately established because of the open contacts in the traction detector device 12. These electromagnets will remain deenergized and their valve units 68 and 69 will remain in the upper position. Fluid under pressure supplied to the brake application pipe can then flow only to the diaphragm chambers 61 and 63. As before described, the control valve device will then operate to supply fluid under pressure to the brake cylinder to a degree which bears to the pressure of fluid in the brake application pipe the same relation that the area of diaphragm 50 bears to the area of diaphragm 48.

Upon the establishment of a low pressure in the brake cylinder, as for example ten pounds, the two pressure operated valve devices 14 and 15 will operate to shift their valve units 119 and 127, respectively, to the lower position. The valve device 14 functions to isolate the traction detector reservoir 20 from the feed valve device 18, while the valve device 15 functions to connect the traction detector reservoir to the pipe 129 and thus to the cylinder 87.

With the vehicle traveling in excess of sixty miles per hour, both the H electromagnet 130 and the M electromagnet 131 will be energized, while the L electromagnet 132 will be deenergized. As a result, neither of the volume reservoirs 21, 22 and 23 will be connected to the pipe 129. The traction detector reservoir 20 will therefore equalize with the cylinder 87, and a maximum pressure will be produced in chamber 89. The shoe 95 will therefore be depressed into engagement with the rail 96 with a maximum force.

If now at the time the brake application is initiated bad rail conditions exist, the force of friction acting on the shoe 95 will be relatively low. If the force of friction is so low that the arm 100 is not rotated far enough for contact 107 to engage contacts 110 it will be obvious that the high speed electromagnet 65 will not be energized although the vehicle speed is in excess of sixty miles per hour. If the rail conditions are very bad contact 108 may not engage contacts 111, in which case the middle speed electromagnet 66 will not be energized. Thus if the initial condition of the rails is bad the initial degree to which the brakes may be applied is limited. If the initial rail condition is good, then arm 100 will swing in a clockwise direction far enough to complete the circuits to the high and middle electromagnets, and as a result the valve device 11 will establish a brake cylinder corresponding to brake application pipe pressure, as heretofore described.

Assuming now that good rail conditions exist initially and throughout the entire stop, it will be obvious that when the speed of the vehicle diminishes to slightly below sixty miles per hour, contacts 152 will be opened and the high speed electromagnet 65 will be deenergized. As a result, brake cylinder pressure will be reduced by the first step provided for by the diaphragm arrangement in control valve device 11.

At the same time, the opening of contacts 152 deenergizes the H electromagnet 130, so that volume reservoir No. 1 is placed in communication with pipe 129. The traction detector reservoir is now in communication with the cylinder 87 and the volume reservoir No. 1, so that the equalization pressure diminishes to a lower value than existed before. This reduces the pressure with which the shoe 95 is pressed into engagement with the track rail.

The purpose of reducing the pressure acting on the shoe 95 is to compensate for the increasing coefficient of friction between the shoe and rail as the speed of the vehicle diminishes. If such a compensation were not made, the arm 100 would be gradually rotated progressively in a clockwise direction as the speed of the vehicle diminishes and the coefficient of friction between the shoe and rail increases. It would then measure the increasing coefficient of friction rather than the tractive condition of the rail.

As the speed of the vehicle diminishes to forty-five miles per hour, contact plate 153 disengages from stationary contacts 154, and accordingly the middle speed electromagnet 66 and the M electromagnet 131 are both deenergized. Deenergization of the middle speed electromagnet 66 effects a further step reduction in brake cylinder pressure, while deenergization of the M electromagnet 131 effects a reduction in the pressure in cylinder chamber 89 by connecting volume reservoir No. 2 in parallel with the traction detector reservoir 20, volume reservoir No. 1 and cylinder 87.

In a similar manner, when the vehicle speed diminishes to fifteen miles per hour, contact plate 157 engages stationary contacts 158, whereupon the low speed electromagnet 67 and the L electromagnet 132 are both energized. A further reduction in brake cylinder pressure is established as well as a further reduction in the pressure of fluid in chamber 89.

Thus it will be observed that as the speed of the vehicle diminishes, with good rail conditions maintained throughout, brake cylinder pressure is reduced in a series of predetermined steps, and at the same time the force acting to hold shoe 95 in engagement with the rail is likewise and similarly reduced to compensate for the increasing coefficient of friction between shoe and rail.

If now at any time during the brake application bad rail conditions are encountered, the force of friction acting upon the shoe 95 will be accordingly diminished. As a result, the arm 100 will be caused to rotate in a counterclockwise direction to sequentially open one or more of the circuits to the high speed, middle speed and low speed electromagnets of the control valve device. In the event that any one or more of these circuits have already been opened by operation of the speed controlled switch device 13, the opening of the traction detector contacts will have no effect. But if the traction detector contacts are opened ahead of those of the speed controlled switch device, it will be apparent that the maximum permissible limit to which the brakes may be applied will be reduced.

Thus the degree to which the brakes may be applied is limited not alone by the action of the speed controlled switch device 13, but is also limited by the action of the traction detector device 12.

It is to be particularly noted that the traction detector device functions to determine the tractive condition of the rails for every instant throughout the entire stop. If during a given speed range, as for example between forty-five and sixty miles per hour, bad rail conditions are first encountered, and then the rail conditions immediately improve, the traction detector device will first operate to reduce brake cylinder pressure and then subsequently to increase brake cylinder pressure, in accordance with the actual track conditions. This provides for utilizing the maximum permissible braking effort and thus effecting the shortest possible stop.

If after initiating an application of the brakes it is desired to reduce or increase the degree of the application, the pressure in the brake application pipe is decreased or increased, as desired. If the pressure in the brake application pipe is decreased at a time when the communication between the pipe and any one of the diaphragm chambers is closed by either of the valve units 68, 69 and 70, fluid under pressure may be released from the chamber past one of the check valve devices 81, 82 and 83. But when the pressure in the brake application pipe is increased, it can be increased in only those chambers which are in communication with the brake application pipe by way of one of the aforementioned valve units. Regardless of the degree to which the brakes are initially applied, or subsequently varied, it is at all times subject to the action of either the speed controlled switch device 13 or the traction detector device 12.

To completely release the brakes, fluid under pressure is completely released from the brake application pipe 72, in which event control valve device 11 will completely release fluid under pressure from brake cylinder 10 and pipe 43. As the pressure in pipe 43 falls below the low value of ten pounds, the valve device 15 disconnects the traction detector reservoir from pipe 129, and pipe 129 is connected to the atmosphere by way of port 125. As the pressure is exhausted from this pipe and the connected volumes, spring 90 returns the shoe device 95 to its uppermost position.

At the same time, the valve device 14 operates to reconnect the traction detector reservoir 20 to the feed valve device 18. The traction detector reservoir is thus recharged according to the setting of the feed valve device. It is to be particularly observed that pressure in the traction detector reservoir may be adjusted by adjusting the setting of the feed valve device, and thus the pressure which acts to press the shoe 95 to the rail may be adjusted. The adjusting screw 105 also provides for a certain degree of adjustment of the parts.

I also wish to point out that in the event that the control valve device 11 is replaced by an electrical type self-lapping valve device, wherein the degree of delivered pressure is regulated according to the degree of energization of the device (in which event some form of rheostat control will be substituted for the speed controlled switch device 13), the traction detector device may still be applied to such a system by substituting for the contacts associated with arm 100 some conventional form of rheostat. This rheostat would merely change the resistance in the circuit to the self-lapping valve winding, and thus change the pressure delivered thereby.

I have illustrated the two valve devices 14 and 15 as being connected to the brake cylinder and thus operating at brake cylinder pressure, but it is to be understood that these devices may be connected to any pipe or volume which has fluid supplied thereto and released therefrom concurrently with supply to and release from the brake cylinder.

My invention is not to be taken as limited solely to a construction such as that disclosed in the drawing, but is broadly stated and defined in the appended claims.

Having now described my invention, what I claim as new and desire to secure by Letters Patent, is:

1. In a vehicle brake system, in combination, a brake cylinder, valve means for progressively reducing in predetermined steps the pressure of fluid supplied to said brake cylinder, an element carried by the vehicle and being adapted to be depressed into and held in engagement with a track rail as the vehicle moves therealong, and means controlled by the force of friction between said element and said rail for controlling said valve means.

2. In a vehicle brake system, in combination, a brake cylinder, valve means for controlling the supply of fluid under pressure to and its release from said brake cylinder and operable to progressively reduce brake cylinder pressure in predetermined steps, an element carried by the vehicle, means for depressing said element into engagement with a track rail as the vehicle passes therealong, and means governed by the force of friction between said element and said track rail for continuously controlling operation of said valve means throughout the brake application.

3. In a vehicle brake system, in combination, an element carried by the vehicle adapted to be depressed and held in engagement with a track rail as the vehicle passes therealong, means governed by the force of friction between said element and a track rail for controlling the degree of application of the brakes, and means for controlling the force with which said element is pressed against said rail according to the speed of the vehicle.

4. In a vehicle brake system, in combination, an element carried by the vehicle, means for depressing said element into engagement with a track rail as the vehicle passes therealong, means governed by the force of friction between said element and said rail for controlling the degree of application of the brakes, and means for controlling the force with which said element is pressed against said rail in accordance with the speed of the vehicle.

5. In a vehicle brake system, in combination, an element carried by the vehicle, means for depressing said element into engagement with a track rail as the vehicle passes therealong, means governed by the force of friction between said element and said rail for controlling the degree of application of the brakes, and means for varying the force with which said element is depressed against said track rail in response to variations in vehicle speed.

6. In a vehicle brake system, in combination, a brake cylinder, means for effecting a supply of fluid under pressure to said brake cylinder to effect an application of the brakes, valve means operative to reduce brake cylinder pressure in predetermined steps, an element adapted to be held depressed in engagement with a track rail as the vehicle passes therealong, and means governed by the force of friction between said element and the rail for controlling said valve means.

7. In a vehicle brake system, in combination, a brake cylinder, valve means for controlling brake cylinder pressure and being operative to reduce brake cylinder pressure in predetermined steps, an element carried by the vehicle and adapted to be depressed into engagement with a track rail with variable forces, means governed by the force of friction between said element and said track rail for controlling the operation of said pressure controlling means, and means governed by the speed of the vehicle for controlling the force with which said element is pressed against said rail.

8. In a vehicle brake system, in combination, a plurality of sets of contacts each of which corresponds to a different permissible degree of application of the brakes, an element adapted to be pressed into engagement with a track rail, said element being movable according to the force of friction between said element and said rail, and means associated with said element for selectively operating said contacts.

9. In a vehicle brake system, in combination, a plurality of sets of contacts adapted when operated to condition the brake system for various permissible degrees of application of the brakes, an element adapted to be pressed into engagement with a track rail, said element being movable according to the force of friction between said element and said rail, and means governed by the movement of said element for controlling the operation of said contacts.

10. In a vehicle brake system, in combination, a brake cylinder, valve means for controlling in predetermined steps the permissible degree of pressure establishable in said brake cylinder, an element carried by the vehicle, means for moving said element into engagement with a track rail, said element being movable in one direction according to the force of friction between said element and the track rail, and means for controlling the operation of said valve means in response and according to movement of said element.

11. In a vehicle brake system, in combination, a brake cylinder, an arm movable through a predetermined zone, means for varying the degree of brake cylinder pressure to cause it to assume a value according to the position of said arm in said zone, and means for determining the position of said element according to the tractive condition of a track rail.

12. In a vehicle brake system, in combination, an element carried by the vehicle and being adapted to be depressed into engagement with a track rail, means providing for positioning said element in a horizontal direction in accordance with the force of friction between said element and said track rail, and means for predetermining the permissible initial degree of application of the brakes in accordance with the initial horizontal position of said element, and for thereafter varying the degree of the brake application as the position of said element changes due to changes in the force of friction.

13. In a vehicle brake system, in combination, a brake cylinder, valve means for progressively varying the degree of brake cylinder pressure in preselected ratios, an element carried by the vehicle, means for depressing said element into engagement with a track rail and for maintaining said engagement as the vehicle passes along said rail, means providing for movement of said element in accordance with the force of friction between said element and said rail, and means governed by the movement of said element for controlling the operation of said valve means.

14. In a vehicle brake system, in combination, a brake cylinder, valve means for controlling the degree of pressure established in said brake cylinder, an element carried by the vehicle, means for moving said element into engagement with a track rail, means for governing the force with which said element is pressed against said track rail according to vehicle speed, and means governed by the force of friction between said element and said track rail for controlling said valve means.

15. In a vehicle brake system, in combination, means including an element slidable along a track rail for progressively determining the tractive condition of the rail, and means for progressively changing the permissible limit for the degree of application of the vehicle brakes according to the instant determination of the tractive condition of the rail.

16. In a vehicle brake system, in combination, means operated according to the speed of the vehicle, means for determining the tractive condition of a track rail, and means controlled jointly by said two means for controlling the permissible degree of application of the brakes.

17. In a vehicle brake system, in combination, a device operated according to the speed of the vehicle, a second device adapted to be pressed into engagement with a track rail to determine the tractive condition of the rail, and valve means controlled by said two devices for limiting the permissible degree of application of the brakes.

18. In a vehicle brake system, in combination, a plurality of electric circuits which are energized or deenergized to control the degree of application of the brakes, a device operated according to the speed of the vehicle, means including a device adapted to engage a track rail for determining the tractive condition of the rail, and means controlled by said two devices for controlling the energization and deenergization of said circuits.

19. In a vehicle brake system, in combination, a plurality of electric circuits adapted to be energized and deenergized to control the degree of application of the brakes, speed controlled contacts connected in said circuits, other contacts also connected in said circuits, and means operated according to the tractive condition of a vehicle rail over which the vehicle passes for controlling the operation of said other contacts.

20. In a vehicle brake system, in combination, a brake cylinder, an electrically operated valve mechanism for controlling the degree of brake cylinder pressure to control the degree of application of the brakes, electric circuits through which current is supplied to operate said electrically operated valve mechanism, a device operated according to the speed of the vehicle, and a second device operated according to the tractive condition of a track rail over which the vehicle passes, said two devices and said circuits being so arranged that said circuits are jointly controlled by said two devices.

21. In a vehicle brake system, in combination, a brake cylinder, a plurality of magnet valve devices for controlling the degree of brake cylinder pressure, a device operated according to the speed of the vehicle, traction detector means including an element engageable with a track rail for determining the tractive condition of the rail, and means whereby said plurality of magnet valve devices are subjected to the joint control of said speed controlled device and said traction detector means.

22. In a vehicle brake system, in combination, a brake cylinder, a valve mechanism for controlling the supply of fluid under pressure to and its release from said brake cylinder and being operative to reduce brake cylinder pressure in predetermined steps, speed controlled means, rail traction detector means, and means for subjecting said valve means to the joint control of said speed controlled means and rail traction detector means.

23. In a vehicle brake system, in combination, an element carried by the vehicle adapted to be pressed into engagement with a track rail, means governed by the force of friction between said element and said track rail for controlling the degree of application of the brakes, and means for varying the force with which said element is pressed against said track rail.

24. In a vehicle brake system, in combination, a brake cylinder, an element carried by the vehicle and adapted to be pressed into engagement with a track rail over which the vehicle passes, means governed by the force of friction between said element and said track rail for controlling the degree of brake cylinder pressure, and means controlled by fluid at brake cylinder pressure for controlling movement of said element into engagement with said track rail.

25. In a vehicle brake system, in combination, an element carried by a vehicle and adapted to be pressed into engagement with a track rail over which the vehicle passes, fluid pressure operated means for pressing said element against said track rail, means for controlling the supply of fluid under pressure to and its release from said fluid pressure operated means, and means for varying the degree of pressure of fluid supplied to said fluid pressure operated means as the speed of the vehicle diminishes.

26. In a vehicle brake system, in combination, an element carried by the vehicle and adapted to be pressed into engagement with a track rail over which the vehicle passes, a cylinder operable to press said element into engagement with said rail with a force in accordance with the pressure of fluid supplied thereto, means for reducing in predetermined steps the fluid pressure established in said cylinder, and means controlled by a variable operating condition of the vehicle for controlling said last means.

27. In a vehicle brake system, in combination, an element carried by the vehicle and adapted to be pressed into engagement with a track rail over which the vehicle passes, means governed by the force of friction between said element and said track rail for controlling the degree of application of the brakes, fluid pressure operated means for pressing said element against said track rail, a reservoir normally charged with fluid under pressure and being normally connected to a source of supply of fluid under pressure, and means operative upon effecting an application of the brakes for isolating said reservoir from said source of supply and for connecting said reservoir to said fluid pressure operated means.

J. WARREN STAUFFER.